United States Patent [19]

Rist et al.

[11] 4,012,677
[45] Mar. 15, 1977

[54] SPEED CONTROL FOR ELECTRICALLY PROPELLED TRACTION VEHICLES

[75] Inventors: Donald Hammond Rist; Barry Jay Turley, both of Erie, Pa.

[73] Assignee: General Electric Company, Erie, Pa.

[22] Filed: Feb. 27, 1975

[21] Appl. No.: 553,865

[52] U.S. Cl. .................. 318/149; 318/84; 290/14; 321/61
[51] Int. Cl.² .................................. B60L 11/02
[58] Field of Search ............ 318/149, 153, 152, 84, 318/151; 290/14, 17; 324/123; 321/61

[56] References Cited
UNITED STATES PATENTS

| | | | |
|---|---|---|---|
| 3,047,786 | 7/1962 | Ouden | 318/153 |
| 3,492,556 | 1/1970 | Friend | 318/149 |
| 3,551,685 | 12/1970 | Corry | 318/151 X |
| 3,771,821 | 11/1973 | Rist et al. | 290/14 |
| 3,878,400 | 4/1975 | McSparran | 290/14 |

Primary Examiner—Benjamin Dobeck
Attorney, Agent, or Firm—A. S. Richardson, Jr.

[57] ABSTRACT

An electrical propulsion control system for self-propelled traction vehicles of the type having a prime mover-driven electric generator supplying energy to traction motors and regulating means for maintaining the electrical output of the generator within desired limits, wherein the limit of generator output voltage is varied between zero and a predetermined maximum level as a function of desired vehicle speed.

8 Claims, 4 Drawing Figures

SPEED CONTROL FOR ELECTRICALLY PROPELLED TRACTION VEHICLES

BACKGROUND OF THE INVENTION

This invention relates generally to electric propulsion systems for self-propelled traction vehicles, and it relates more particularly to such a system for driving a traction vehicle at controllable speeds.

In one embodiment of the invention to be disclosed hereinafter, the electric propulsion system is intended to drive earthmoving machines known technically as "wheel loaders" (standard J1057 of the Society of Automotive Engineers) and popularly as "front end loaders." A front end loader comprises a self-propelled vehicle with an integral front-mounted bucket supporting structure and linkage that loads earth and other materials into the bucket through forward motion of the vehicle and then lifts, transports, and discharges the load. Such a machine typically includes an articulated frame and a four-wheel drive. Both front and rear axles can be driven by an electrical system comprising a pair of variable speed reversible d-c motors (each having an armature and a field) which are energized by a generator coupled to a diesel engine or other suitable prime mover, and the bucket and its boom can be powered by hydraulic means including lift cylinders which derive their hydraulic pressure from the same prime mover. By appropriate manipulation of a speed-control pedal and a forward-reverse selector lever, an operator can control the electric drive system so as to determine, respectively, the machine's speed and direction of movement. The various operating modes of such a system include propulsion (motoring) or dynamic retardation (braking) in either a forward or reverse direction, with the bucket either loaded or unloaded; propelling the machine forward with the bucket down to penetrate a pile of earth ("crowding"); and lifting the bucket while the wheels are either stationary or moving forward or backward.

Propulsion systems for front end loaders should preferably have certain characteristics including: (1) smooth control of torque, (2) minimal wheel slip for improved tire life, (3) high tractive effort at low speeds to permit the loader bucket to readily penetrate the pile, termed "full crowd tractive effort," (4) relatively constant prime mover engine speed to permit rapid cycling and response of the bucket and boom assembly and to facilitate engine smoke control, (5) controllable vehicle speed, and (6) simplified control, such as, for example, to facilitate the repeated reversals in direction required during operation. Whereas the present invention will be described in connection with a propulsion system having the above characteristics and particularly adapted for front end loaders, it may be utilized in other types of electrical drives including those for other types of vehicles and those providing certain alternative characteristics.

SUMMARY OF THE INVENTION

The general objective of the present invention is the provision, in an electric propulsion system for a traction vehicle including a thermal prime mover which drives a generator supplying electrical energy to traction motors propelling the vehicle, of a relatively simple scheme for controlling the vehicle speed in accordance with the manual setting of a speed controller.

In carrying out the invention in one form, the electric traction motors of a traction vehicle are energized by the output of an electric generator driven by a suitable thermal prime mover. The traction motors are of a type whose speed, during propulsion of the vehicle, depend on the voltage output of the generator. The prime mover normally drives the generator at a relatively constant rate, and a variable excitation source is arranged normally to supply a predetermined maximum level of excitation to the generator field. The propulsion control system includes means for determining voltage and power limits of the electrical output supplied by the generator to the traction motors and for reducing the generator field excitation in the event detected levels of voltage and power exceed their respective limits. A manually adjustable vehicle speed controller is provided, and the aforesaid voltage limit is modified as a function of the setting of the speed controller so as to vary with desired vehicle speed between zero and a predetermined maximum level without changing the maximum power limit of the generator.

The invention will be better understood and its various objects and advantages will be more fully appreciated by the following description taken in conjunction with the accompanying drawings.

DESCRIPTION OF PREFERRED EMBODIMENT

Figure 1:
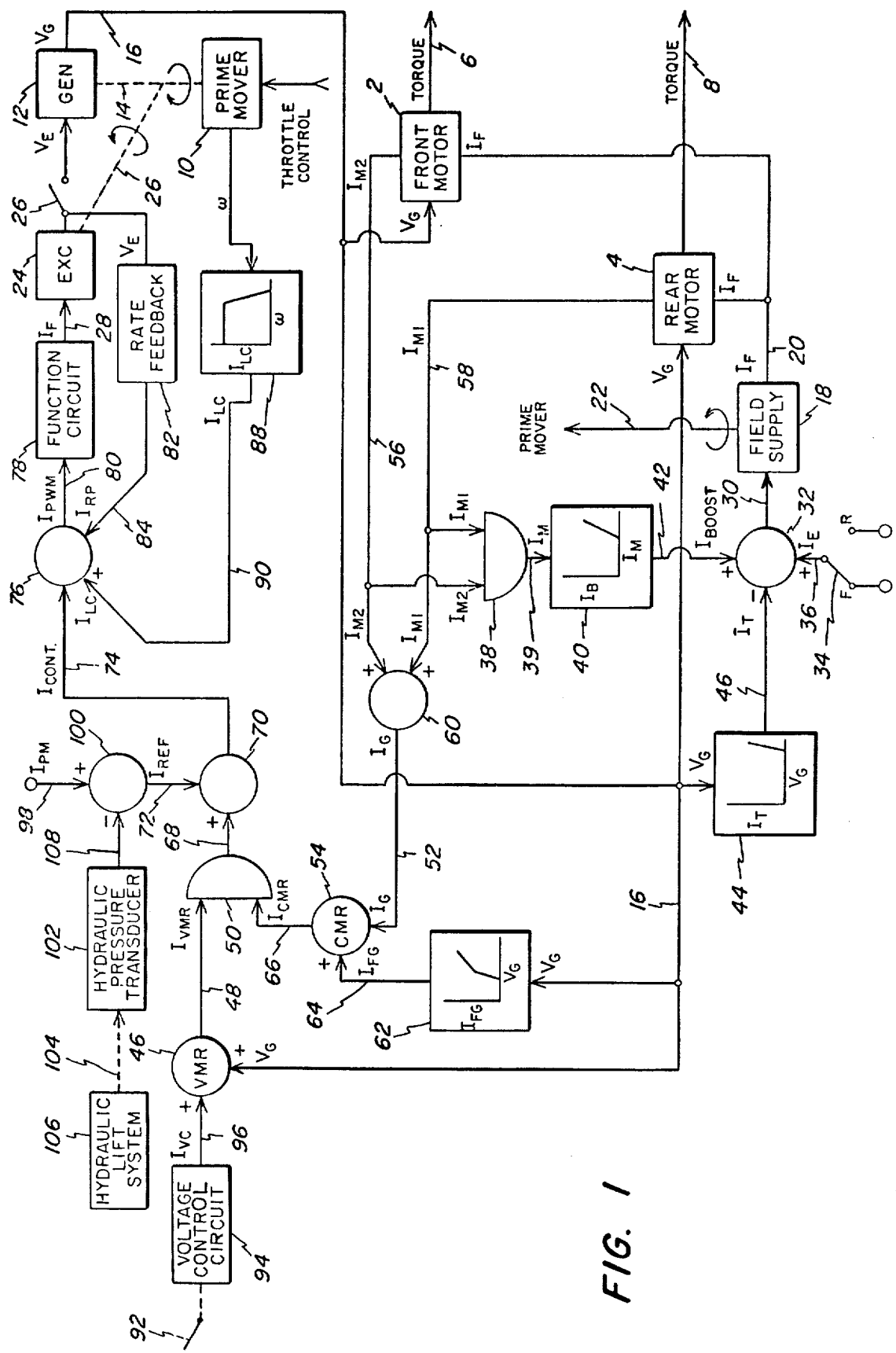
FIG. 1 is a functional block diagram of an electric propulsion system incorporating the present invention, which system includes a pair of motors energized by a generator driven in turn by a prime mover.

FIG. 1 shows a preferred embodiment of an electrical propulsion system useful for driving a front end loader or the like. To facilitate an understanding of the main parts of this system and of its overall operation, the following description is organized under separate headings and preferred means for implementing certain functions in the system are shown in greater detail in other figures. After this description, the specification will conclude with claims pointing out the particular features of the system that are regarded as the subject matter of the present invention. Other features of the described system are claimed in co-pending patent applications filed concurrently herewith and assigned to the assignee of the present invention. The co-pending patent applications and their titles are as follows:

| S.N. 553,864 | Lifting Force Responsive Load Control For Electrically Propelled Earthmoving Vehicles |
| --- | --- |
| S.N. 553,862 | Prime Mover Speed Responsive Load Control For Electrically Propelled Traction Vehicles |
| S.N. 553,861 | Field Boost Arrangement For Separately Excited D-C Traction Motors Of A Vehicle Propulsion System |
| S.N. 553,866 | Field Tapering Arrangement For Separately Excited D-C Traction Motors Of A Vehicle |

| -continued |
| --- |
| Propulsion System |

With particular reference now to FIG. 1, the illustrated propulsion system includes a front motor 2 and a rear motor 4 which are intended to propel, or to retard, the front and rear axles, respectively, of the front end loader by a coupling arrangement schematically indicated by lines 6 and 8. In lieu of a single motor axle, multiple motors may of course be utilized, such as, for example, separate electrically powered traction wheels having their armatures connected in parallel or in series during propulsion, i.e. motoring operation. The electrically powered traction wheels may be of the general type disclosed in U.S. Pat. No. 2,899,005 — Speicher.

Each of the traction motors 2 and 4 is a variable speed, reversible d-c motor having an armature and a separately excited field. The armatures of the two motors are connected in parallel for energization by the same voltage, and as is shown more clearly in FIG. 4, the motor fields are connected in series with each other for separate excitation by the same field current. A thermal prime mover 10, such as, for example, a diesel engine, drives, as is indicated by dashed line 14 in FIG. 1, electrical generating means 12 which in turn provides an electrical output to the parallel connected armature means of motors 2 and 4, as schematically indicated by line 16. A source of field current, field supply means 18, provides field current, $I_F$, on line 20, to the series connected field windings of motors 2 and 4. In the preferred embodiment, the field supply means 18 is a rotary d-c generator which is also driven by the prime mover 10, as schematically indicated by line 22. The described arrangement provides substantially identical armature voltages and field currents, and thus field flux, to the separately excited traction motors so that each motor maintains identical rotational speeds. This feature assists in minimizing wheel slip.

Motor performance, i.e. motor torque and speed, is a function of the magnitude of applied armature voltage, and thus armature current, and magnitude of field flux, i.e. applied field current. In the preferred embodiment these parameters are controlled by applying appropriate excitation to the fields, respectively, of the electrical generating means 12 and of the field supply generator 18. In the illustrated embodiment field excitation for generating means 12 is provided by exciting generator 24, whose output $V_E$ is coupled through switch 26 to the field circuit of generating means 12. The output of exciter 24 constitutes an amplified output of the signal $I_F$ applied on line 28 to excite the field of the exciter generator. This signal $I_F$ is regulated by a regulating system described subsequently.

MOTOR FIELD EXCITATION

The magnitude of motor field flux is determined by the field excitation of field supply generator 18, i.e. the magnitude of field current supplied on line 30. Preferably the motor field, and thus the field current on line 30, is of predetermined constant magnitude under normal operating conditions, and this magnitude is selected so that motor flux is above the knee of its saturation curve. The field current 30 may, for example, be supplied from a constant current source, such as a battery, connected serially with a resistance and a field winding of generator 18. As subsequently described, however, improved performance is obtainable by automatically modifying the field current under special conditions. One occurs when unusual tractive effort is required, such as needed for the bucket to crowd into a pile. A field current boost circuit responsive to traction motor currents in excess of a predetermined magnitude automatically provides additional field excitation to increase motor torque. This permits attainment of adequately high motor torque while maintaining motor armature current within desired limits. The other condition occurs when additional vehicle speed is required when maximum armature voltage is supplied to the traction motors. The field current is then automatically reduced to provide field weakening and extended speed operation. The summation circuit 32 of FIG. 1 functionally presents an arrangement for thus modifying field energization. The previously referenced normal state field current, $I_E$, is illustrated as being supplied from forward-reverse switch 34 and line 36 to summer 32. Under normal conditions this constitutes the sole excitation of the field supply generator. Double pole switch 34 functionally illustrates an arrangement for reversing the rotational direction of the traction motors for reversing the vehicle. Motor reversal is obtained by reversing the field excitation current, such as by reversing the connections between the field winding and the source of potential supplying the field current. Obtaining reversal by switching the relatively small field current supplied to the field supply generator, permits use of switching devices, such as contactors, having limited current carrying capability.

In order to obtain the above-referenced field current boost, a current boost signal, $I_{BOOST}$, is applied from the field current boost circuit, comprising OR gate 38 and hold off gate 40, by line 42 to summer 32. Motor armature current signals on lines 56 and 58 are supplied to OR gate 38 which supplies the current signal of highest amplitude $I_M$ on line 39 to hold off gate 40. Gate 40 provides an output $I_{BOOST}$ on line 42 in the event signal $I_M$ exceeds a predetermined threshhold. Preferably $I_{BOOST}$ increases proportionately with further increases of signal $I_M$.

In order to obtain the above-referenced field weakening, a field weakening signal, $I_T$, is applied from a field weakening circuit, comprising hold off gate 44, by line 46 to summer 32. Hold off gate 44 receives an input $V_G$ representative of traction motor voltage or output voltage of generating means 12. In the event this signal exceeds a predetermined magnitude, preferably near the maximum rated voltage, gate 44 supplies an output signal $I_M$ on line 46.

As indicated in FIG. 1, the boost current on line 42 is combined additively, and the field weakening current on line 46 is combined subtractively, with the normal field current $I_E$ on line 36. In the preferred embodiment the above-described summation function of summer 32 is in fact achieved by utilizing plural field windings on the field supply generator 18.

GENERATOR REGULATING SYSTEM

In order to explain additional features of the system of FIG. 1, reference is now made to the regulating system which controls the output of the electrical generating means 12. As is known, the voltage output of means 12 must be maintained within a predetermined magnitude, primarily to protect the field windings of generating means 12 and to prevent dielectric breakdown of the insulation of the entire traction system.

Figure 2:
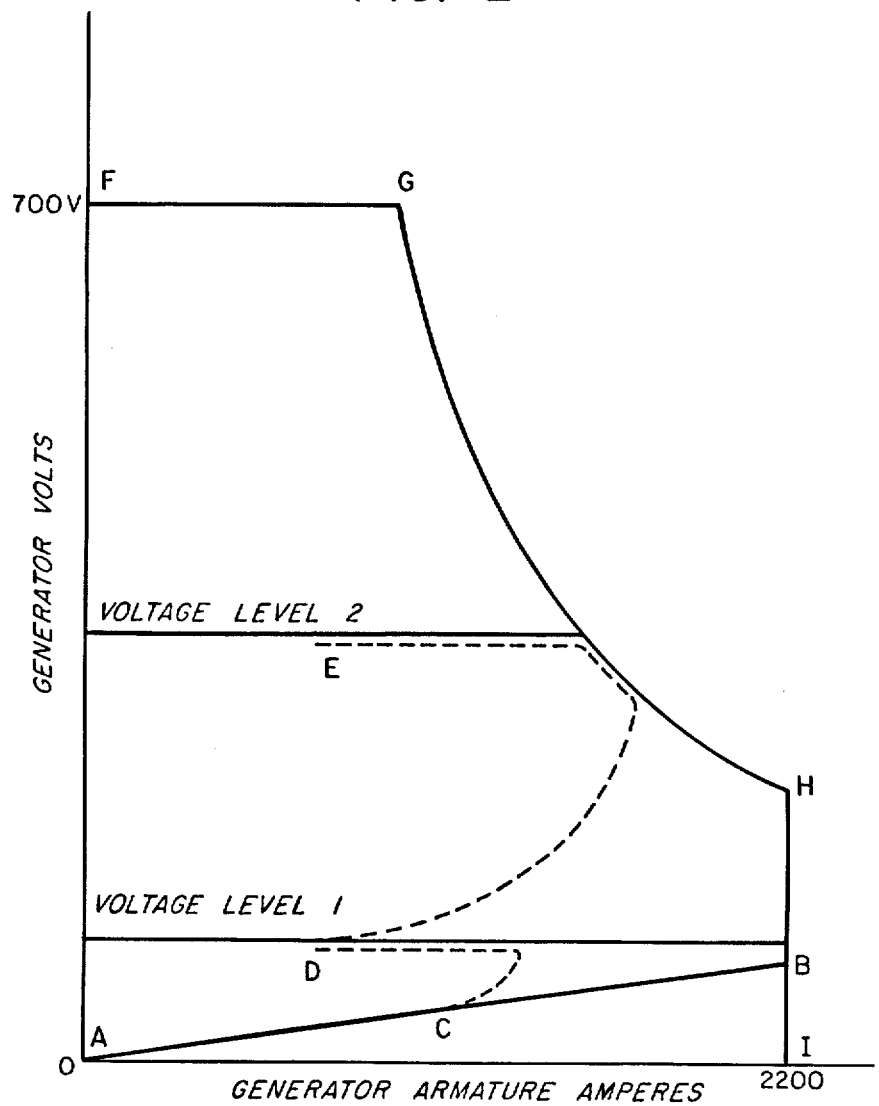
FIG. 2 is a graphic representation of the relationship between output voltage and output current of the generator used in the propulsion system of FIG. 1.

Further the current output of means 12 must be maintained within a predetermined magnitude to protect the armature of generating means 12 and other circuit components. In addition the power output of the generating means 12 must be kept within a predetermined power, e.g. "horsepower," limit to prevent overloading the prime mover engine 10 and to prevent stalling of the engine. Essentially the voltage and current output of the generating means 12 are dependent on the load, i.e. the performance of the traction motors, and are independent of each other. For example, when the vehicle accelerates from standstill the high torque requirements result in high armature current, i.e. the load impedance is very low, and the current must be limited. On the other hand at high speed and minimal torque operation, the traction motors develop substantial counter voltage, i.e. back emf. This is equivalent to increasing the load impedance. Accordingly the voltage output of the generating means increases at high speeds and voltage limiting is required. At intermediate levels of operation, the power output of the generating means must be limited. The horsepower output limit, being a function of the products of voltage and current outputs, is hyperbolic in form. The resulting idealized operating envelope is illustrated in FIG. 2, a plot of the output voltage vs. the output current of generating means 12. Line F—G represents the voltage limit, line H—I represents the current limit, and hyperbolic curve portion G—H represents the horsepower limit portion of the envelope. The regulating system assures that the output of the generating means does not exceed the limits prescribed by the abovedescribed envelope. This is achieved essentially by deriving signals representative of the voltage and current outputs of the generating means, processing these voltage and current signals to provide a signal which is a function of the power output of the generating means, and comparing these signals with appropriate reference signals to derive a control, or error, signal. The control signal controls the field excitation of the generating means to maintain output within the desired generator voltage and current envelope, i.e. within predetermined maximum voltage, power, and current parameters. In the preferred embodiment illustrated in FIG. 1, line 16 provides voltage feedback signals representative of the actual voltage $V_G$ applied from the output of the generating means to the armature circuit of the traction motors, and line 52 provides current feedback signals representative of the actual current output supplied by the generating means to the armature circuit of the traction motor means. As illustrated in FIG. 1, this current feedback signal may be derived by detecting signals representative of the armature currents of the front motor means 2, on line 56, and of the rear motor means 4, on line 58, and summing these signals, $I_{M1}$ and $I_{M2}$, in summation device 60 so as to provide the above-referenced current feedback signal, $I_G$, on line 52. The voltage feedback signal on line 16, and the current feedback signal on line 52 are processed by devices 62 and 54 to generate a signal on line 66 which varies appropriately as a function of the power output of the generating means, and thus may be termed a power feedback signal. The voltage signal on line 16 is supplied to device 46 where it is subject to modification in a manner to be described subsequently. The voltage signal output of device 46, $I_{VMR}$, on line 48, and the power feedback signal $I_{CMR}$ on line 66 are supplied to a comparison circuit comprising devices 50 and 70. The comparison circuit compares the voltage feedback signals and the power feedback signals with a reference signal, $I_{REF}$, applied by line 72 to device 70, to provide, at its output line 74, a control signal, $I_{CONT}$. The control signal is appropriately modified by devices 76 and 78 to provide on line 28 an exciter field current $I_F$ which is supplied to the field of the exciting generator 24. The control signal produced by the comparison circuit thus modifies the field excitation of the generating means to limit its output within the predetermined maximum voltage, power, and current limits which were described with reference to FIG. 2. The above-described aspects of the generator regulating system of the preferred embodiment are for the most part disclosed in U.S. Pat. No. 3,105,186 and in Parts 12 through 14 of "Electronics on the Rails" by Robert K. Allen published in "Railway Locomotives and Cars" about 1966–1967.

Reference is again made to FIG. 1 for a further description of the regulating system. The voltage feedback signal on line 16 is supplied to one input of summer 46, a voltage measuring reactor (VMR). As subsequently described a speed control member 92, such as a foot pedal, controls the output of voltage control circuit 94, voltage control signal $I_{VC}$, which is applied by line 96 to a second input of summer 46. The output of device 46, a current $I_{VMR}$, is supplied by line 48 to one input of gate 50. The current feedback signal $I_G$ on line 52 is supplied to one input of summer 54, a current measuring reactor (CMR). The output of summer 54, a current $I_{CMR}$ on line 66, is supplied to a second input of gate 50. The output of the gate 50, consisting of the input signal having the larger amplitude, is supplied by line 68 to one input of summer 70.

A reference current signal, $I_{REF}$, on line 72, is applied to another input of summer 70 so as to be subtractively combined with the signal on line 68. Under normal conditions of vehicle operation, the signal $I_{REF}$ corresponds to signal $I_{PM}$ on line 98 which is generally representative of normally available horsepower output of the prime mover 10 and in the preferred embodiment has a predetermined constant magnitude. However, as subsequently explained, the reference current signal is subject to modification such as when the vehicle is engaged in penetrating and lifting earth matter. Under such conditions the reference current signal $I_{REF}$ is subject to modification responsive to the lifting force applied to the earth moving means, e.g. boom and shovel. The arrangement for thus modifying the reference current signal comprises devices 100, 102 and 106.

The gate 50 and summer 70 thus constitute a comparison circuit which selected the greater one of the output signals of the VMR summer and of the CMR summer and compares the greater of these signals with the reference signal $I_{REF}$ to produce a control current signal $I_{CONT}$, on line 74. In the preferred embodiment the control current signal is produced only if the larger one of the VMR and CMR output signals has a greater amplitude than the reference current signal. In the preferred embodiment the comparison circuit comprising the gate 50 and summer 70 is a reference mixer bridge circuit of the type disclosed in U.S. Pat. No. 3,105,186.

The above-described arrangement assures that the output of the generating means is within predetermined maximum voltage and predetermined maximum current limits. It assures that the output voltage of the generating means cannot, for example, exceed the voltage level defined by line F—G of FIG. 2, and that the output current cannot, for example, exceed the current level defined by line H—I of FIG. 2. For example, if the traction vehicle operates at high speed the traction motors develop a substantial counter emf, thus causing a high generator output voltage. If the generator output voltage approaches the predetermined maximum limit, the voltage feedback signal will exceed the current feedback signal. In the event the voltage feedback signal exceeds the reference current signal, comparison of this voltage feedback signal with the reference current signal produces a control current signal which reduces excitation and prevents further increase of the generator output voltage. Similarly under high load current conditions, as encountered during low vehicle speeds, the current feedback signals, exceeding the voltage feedback signals and reference current signals, produces control current to reduce excitation.

In addition to the above-described arrangement for limiting voltage and current output of the generating means, it is necessary to assure that the generator output does not exceed a desired power level, such as for example, the power output defined by segment G-H of FIG. 2. For this purpose the preferred embodiment utilizes function generator 62. Its input is the voltage feedback signal $V_G$ on line 16. The output of the function generator, current $I_{FG}$, is supplied by line 64 to another input of summer 54, the current measuring reactor CMR. Current $I_{FG}$ modifies the output of the CMR summer 54, i.e. the current $I_{CMR}$ on line 66, which would otherwise be solely proportional to the current reference signal $I_G$ on line 52 and thus to the armature current of the traction motor means. Operation of the function generator 62 is now described in connection with FIG. 2. If the generator output voltage is within the voltage amplitude defined, for example, by segment I—H of FIG. 2, the function generator 62 provides no output voltage and the CMR output signal, $I_{CMR}$, is unaffected by the function generator. Under these circumstances the regulator limits output current to within the magnitude defined by segment H—I. However, as the generator output voltage, and the voltage feedback signal on line 16 increase, an increasing signal is applied by line 64 to CMR summer 54 and thus is added to the current feedback signal $I_G$, such that the output signal of summer 54, i.e. current $I_{CMR}$ on line 66 is greater than that which would have been produced solely by the current feedback signal. This increase of the CMR summer output with increasing generator voltage causes the maximum generator output current to decrease with increasing generator output voltage. Therefore the current limit of the generating means output approximates segment H—G of FIG. 2 instead of being maintained at a constant value such as defined by segment I-H. The summer 54 signal $I_{CMR}$, under such conditions, limits the output power of the generating means and therefore constitutes a power feedback signal.

The output of the comparison circuit, i.e. the control signal $I_{CONT}$ output of summation circuit 70, is applied by line 74 to an amplification system which provides an appropriate excitation signal for the generating means 12. In the preferred embodiment illustrated in FIG. 1, the control signal in line 74 is applied to one input of summer 76, whose output current $I_{PWM}$ is applied by line 80 to function circuit 78. The output of function circuit 78, the excitation control current $I_F$, is as previously described, applied by line 28 to the exciter 24 so as to energize the field of generating means 12.

In the preferred embodiment the summer 76 comprises a pulse width modulated (PWM) amplifier, and in particular a magnetic PWM, of the general type disclosed in U.S. Pat. Nos. 2,886,763 and 3,105,186. Such a device produces a train of square wave pulses whose duty cycle is varied, i.e. by modifying the time duration or width of the respective pulses. It comprises a saturable transformer excited by a square wave oscillator with a tapped secondary winding connected in a full wave rectifier circuit to the function circuit 78. The main windings of a controlled saturable reactor are connected in circuit with the end terminals of the secondary windings. Control windings of the controlled saturable reactor apply controlling signals, including the control signal $I_{CONT}$, to summer 76, as illustrated by lines 74, 84, and 90 in FIG. 1. Line 74 supplies the previously described control signal $I_{CONT}$. Line 84 supplies a rate feedback signal $I_{RP}$, preferably derived by coupling the output signal $V_E$ of exciter 24 through rate feedback circuit 82. This provides system stability by limiting accelerating rates and compensating for the long time constant of the generator field in respect to the control system response time.

Additionally, as subsequently described in the section "Prime Mover Speed Responsive Load Control," an electrical signal ω responsive to the shaft speed of prime mover 10 is preferably supplied to the load control circuit 88. In the event the prime mover is overloaded such that its rotational speed decreases below its rated speed, load control circuit 88 produces a load control signal $I_{LC}$ which is coupled by line 90 to summer 76 so as to reduce excitation.

The presence of control signals on lines 74, 84, or 90 varies the core saturation of the previously described saturable reactor such that the d-c signal output of summer 76, which is applied to the function circuit 78, varies inversely with the summation magnitude of the control signals applied to summer 76. When no control signals are applied to the control windings, the reactor cores are saturated such that a maximum positive signal is applied to the input of the function circuit, permitting up to maximum excitation of the generating means. The application of control signals, such as control signal $I_{CONT}$, will reduce the flux in the cores. Thus the output signal, $I_{PWM}$, is reduced proportionately to the sum of the amplitudes of the applied control signals, and the excitation of the generating means is reduced. Block 78 of FIG. 1 illustrates the preferred transfer function of the function circuit 78. For purpose of explanation it is assumed that the control signals applied to summer 76 are zero, e.g. the reference current on line 72 exceeds the larger of the feedback signals applied to the input of gate 50. In this case the output of summer 76, current $I_{PWM}$ is at a minimum amplitude and the excitation field current $I_F$ is at a maximum positive value. As the control currents, e.g. $I_{CONT}$, applied to summer 76 increase, the current $I_{PWM}$ increases proportionately and the excitation field current $I_F$ falls off rapidly. With further increase of the control currents, and resulting decrease of current $I_{PWM}$, the excitation field current decreases to zero and subsequently reverses in polarity until it levels off at a predetermined negative amplitude. This reversal of excitation field current provides a fast reduction of generating means output, and provides for overcoming the residual flux of the generating means so as to permit operation, if desired, at substantially zero output voltage. As previously stated the output of summer 76, as used in the preferred embodiment constitutes a train of sequential pulses whose time duration is minimum when the reference current on line 72 exceeds the larger of the feedback signals applied to gate 50, i.e. under conditions when the output of the generator need not be reduced. The above-recited increase of $I_{PWM}$ is accomplished by increasing the time duration of the individual pulses, e.g. increasing the average value of the signal on line 80.

PRIME MOVER SPEED RESPONSIVE LOAD CONTROL

Reference was made in the preceding section "Generator Regulating System" to a load control arrangement wherein overloading of the prime mover produces a load control signal $I_{LC}$ which is coupled by line 90 to summer 76 so as to reduce excitation. Such an arrangement is advantageous in traction vehicles where the prime mover must supply a variable auxiliary load, i.e. a load additional to the traction motor propulsion system. For example, in front end loaders, the prime mover, e.g. diesel engine, also energizes the hydraulic system for moving the boom and bucket assembly. The load thus imposed on the prime mover varies considerably being maximum when the bucket penetrates the pile of earth matter and the hydraulic system is utilized to lift the boom and bucket. Under the latter conditions the engine is subject to bogging and speed reduction. When the prime mover is overloaded under such conditions, the excitation of the generating means, and thus the electrical load, is reduced in the manner described below.

The prime mover 10 normally operates at a predetermined relatively constant speed controlled by known types of governor systems (not illustrated). The shaft speed $\omega$ of the prime mover 10 is detected, and a load control means 88, responsive to a shaft speed signal, is arranged to generate the load control signal $I_{LC}$ whenever the shaft speed is abnormally low, i.e. is below a first predetermined angular velocity $\omega_a$. As the shaft speed increases above $\omega_a$, the load control signal $I_{LC}$ varies as a suitable inverse function of speed until the load control signal is reduced to zero at a second angular velocity $\omega_b$ which, depending on the particular application of the propulsion system, can be either lower or higher than normal. In one embodiment, for example, the normal, loaded prime mover speed as determined by the governor, is approximately 2100 rpm, and the load control signal $I_{LC}$ is zero until the prime mover looses speed to 2,050 rpm. $I_{LC}$ then increases with decreasing speed to 2,000 rpm and thereafter, for lower speeds, remains at a predetermined substantially constant level. The load control signal $I_{LC}$ is applied from load control 88 by line 90 to summer 76 so as to reduce excitation of the generator 12 when the shaft speed is below $\omega_b$. The signal loop comprising prime mover 10, load control 88 and components 76, 78, 24, and 12 constitute a closed loop circuit which if desired can maintain operation along the slope of the load control signal within the range of speeds defined by $\omega_a$ and $\omega_b$. Thus when auxiliary loads are applied, the electrical load of the prime mover is modified to minimize engine bogging.

The prime mover shaft speed is preferably detected by a speed sensor providing an analog output. For example, a magnetic speed sensor can be used to provide a pulse output whose frequency is proportional to engine speed. The pulse signal is applied to a digital to analog converter. Arrangements of this type are well known in the art, including for example, peak clipping circuits, such as a saturating transformer, providing input signals to a single shot trigger circuit. The output pulses of the trigger circuit are integrated to provide an analog signal having an amplitude proportional to the prime mover speed.

The analog signal is supplied to a transistor amplifier, in load control circuit 88. The amplifier is biased to normally conduct and to produce a predetermined output current with no applied input signal. The amplifier is biased such that conduction is decreased, and output current reduced, when the analog signal is proportional to speed in excess of $\omega_a$. Conduction is cut off and the output current is zero when the analog signal is proportional to a speed $\omega_b$. Thus load control circuit 88 has a sharp cut off characteristic such that the load control signal $I_{LC}$ is strongly increased as a result of a relatively small reduction in prime mover speed.

It should be noted that this arrangement for modifying excitation does not in any manner modify the maximum available traction motor voltage and current limits as established by $I_{REF}$, $I_{VMR}$, and $I_{CMR}$ (as described in the section entitled "Generator Regulating system"). For example, as a front end loader penetrates a pile it exerts maximum torque but operates at a very low speed. The horsepower output of the generating means is a function of the product of speed, i.e. armature voltage, and torque, i.e. armature current. Therefore under such conditions, the horsepower output of the generating means is generally below the maximum available horsepower. However, armature current is maximum under such conditions. When the hydraulic system is concurrently activated to move the boom and bucket, the load on the prime mover is suddenly increased. In response to the resulting reduction of prime mover shaft speed, the above-described load control system reduces the load of the generating means. This is accomplished, however, independently of the parameters ($I_{REF}$, $I_{VMR}$, and $I_{CMR}$) of the regulating system which produces control signal $I_{CONT}$. Accordingly, the maximum available current limit is not modified, and the traction motors can utilize maximum armature currents. Similarly at high speed operation, the prime mover speed responsive load control system does not reduce the maximum available armature voltage.

VOLTAGE LIMIT SPEED CONTROL

Operation of certain off-highway traction vehicles, such as front end loaders, is subject to sudden and substantial modifications of propulsion torque. For example, front end loaders may travel under conditions requiring relatively low propulsion torque, but may suddenly and repeatedly penetrate piles of earth matter so as to be subjected to repeated major increases of propulsion torque. These repeated rapid and substantial variations in propulsion torque make it desirable to provide for automatic regulation of torque and to make operator control of the traction vehicle substantially independent of torque, while assuring that the previously described predetermined maximum voltage, current, and horsepower output limits of the generating means 12 are not exceeded. The previously described regulating system compares feedback signals representative of generator voltage and current to derive a power feedback signal and compares these with reference signals to generate control signals to limit the output of the generating means within such predetermined maximum voltage, current, and horsepower limits. Operator control of the vehicle is attained by a moveable control member connected to produce a voltage control signal representative of the position of the control member. This voltage control output signal is coupled in circuit with the regulating means for comparing the voltage feedback and reference signals so as to reduce the maximum voltage output of the generating means below the predetermined maximum voltage limit, with minimal modification of the maximum horsepower and current limits of the generating means. In the arrangement of FIG. 1, the position of the moveable control member 92 modifies the output, $I_{VC}$, of the voltage control circuit 94. A preferred embodiment of the latter circuit will be described below in the section "Voltage Control Circuit." The voltage control signal $I_{VC}$ is added by summer 46 to the voltage feedback signal $V_G$, such that signal $I_{VMR}$, the output of summer 46, limits the maximum generator output to an output voltage, and thus to a vehicle speed, determined by the position of the control member. Member 92 preferably is a foot pedal normally spring biased in its upper most position. When the pedal is in this position, the level of signal $I_{VC}$ corresponds approximately to the signal $V_G$ which is produced without presence of an $I_{VC}$ signal with maximum predetermined voltage output of the generating means. Signal $I_{VMR}$, the output signal of VMR summer 46, in such case would normally exceed signal $I_{CMR}$, the output of CMR summer 54, and would exceed reference current signal $I_{REF}$, such that summer 70 of the comparison circuit would produce a control signal $I_{CONT}$ sufficient to reduce the maximum voltage output of the generating means to a predetermined minimum level, e.g. slightly above zero volts. As the pedal is depressed by the operator, the signal $I_{VMR}$ is reduced and the maximum available voltage output of the generating means increases proportionately with the amount of pedal depression.

Operation of the voltage limit speed control can be explained with reference to FIG. 2. As indicated before, depression of the pedal 91 selectively increases the maximum available voltage output, until the ultimate predetermined limit F-G is reached. When the operator initially slightly depresses the pedal 92, the $I_{VC}$ signal on line 96 is slightly reduced from its quiescent maximum value. This permits the maximum voltage output of the generating means 12 to increase from zero to a first magnitude such as, for example, voltage level 1 of FIG. 2. Initially the generator output increases from zero substantially linearly along line ACB, since armature current increases and the generator output voltage is proportional to the product of armature current and motor resistance. The traction motor torque is a function of the product of motor field flux and of armature current. When the motor armature current has increased sufficiently to develop an adequate starting torque, the vehicle begins to move, e.g. at point C of FIG. 2. At this point the vehicle develops adequate starting torque which exceeds the subsequently required rolling torque. Therefore, subsequent to starting the available torque will exceed the load demand, causing the vehicle to accelerate. As the vehicle accelerates the traction motors develop back emf, and the generator output voltage rises since this voltage output equals the sum of the back emf and the product of motor armature current and motor resistance. As shown by the dashed line commencing from point C of FIG. 2, the generator output voltage rises to voltage level 1. This is the maximum voltage output of the generator as established by the position of pedal 92. Any further acceleration of the vehicle results in increased back emf. Since the generator output voltage can increase no further the IR product, i.e. the armature current, must decrease. This is illustrated by the horizontal dashed line portion extending to point D of FIG. 2. The traction motor torque is responsive to the load demand. Thus for a given operating condition, e.g. a level road and a fixed rolling resistance the vehicle will eventually maintain a constant speed and a constant armature current, e.g. as shown at point D.

If the pedal 92 is subsequently further depressed, the generator output is permitted to rise to a higher maximum voltage level, such as for example, voltage level 2 of FIG. 2. The increased generator voltage output requires an increase of the back emf and/or the product of armature current and motor resistance. The back emf cannot increase until motor speed increases, i.e. until excess torque is developed. Thus armature current increases initially causing the required increase of torque, of vehicle acceleration, and of back emf. This is illustrated by the dashed line commencing upward from point D. As previously noted line G—H represents the ultimate horsepower limit of the system. As illustrated in FIG. 2 by the portion of the dashed line coincident with the hyperbolic segment of G—H, the generator voltage and current parameters cannot exceed the power limit envelope. As described above acceleration subsequent to the generator output having attained the maximum voltage level, i.e. voltage level 2, results in a reduction of armature current until the balance point E of FIG. 2 is attained. The described arrangement is particularly advantageous for vehicles subject to intermittent changes of load demand, such as front end loaders, since the current is automatically varied to match the load demand. This inhibits excessive acceleration of the motors, i.e. spinning, due to load changes. Operation is also maintained within ultimate current, voltage, and power limits, and the operator need only control vehicle speed, e.g. with the speed control pedal.

CMR, VMR, REFERENCE CURRENT, AND COMPARISON CIRCUITS

Figure 3:
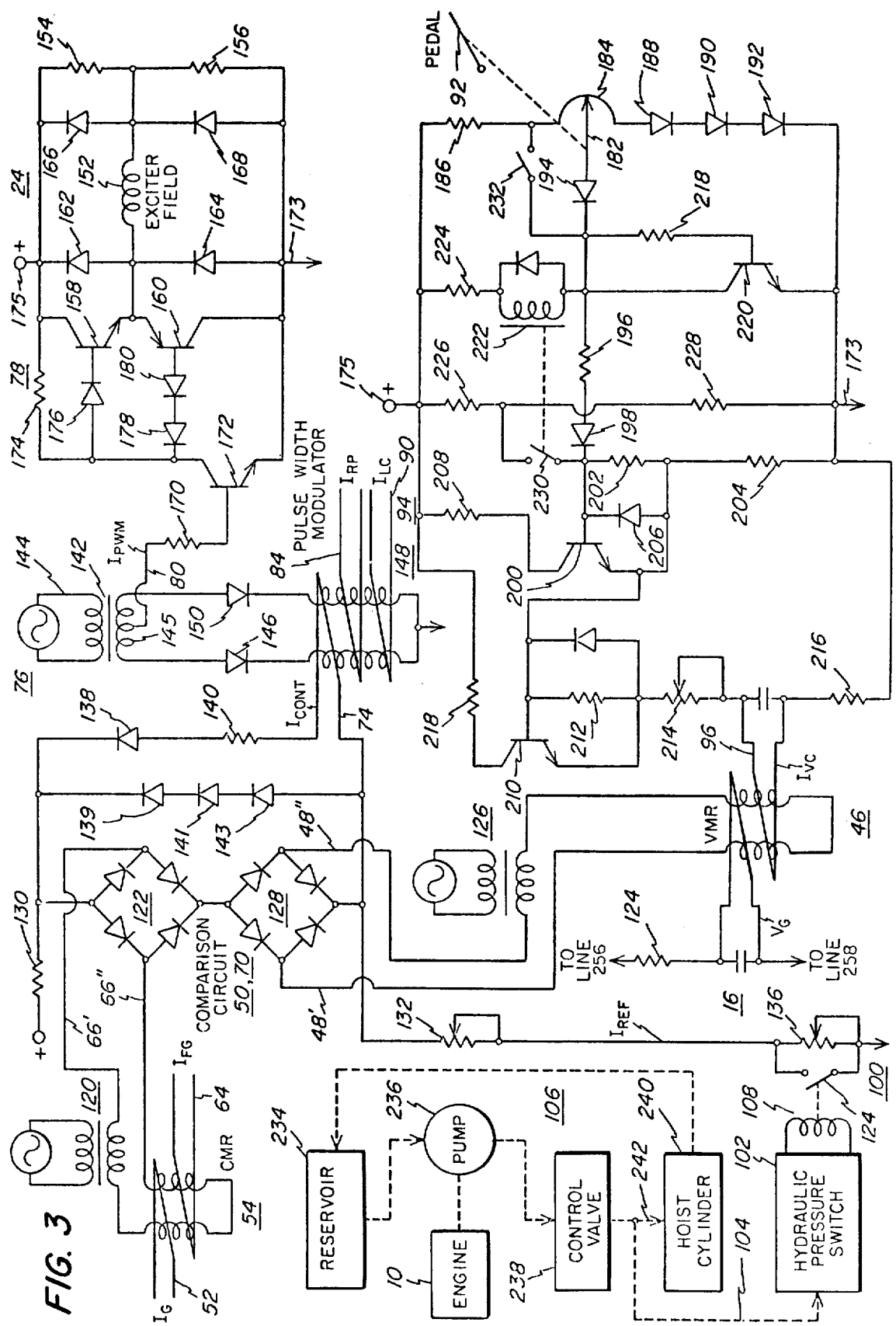
FIG. 3 is a schematic circuit diagram illustrating a preferred embodiment of the means shown in block form in FIG. 1 for regulating the generator output.
Figure 4:
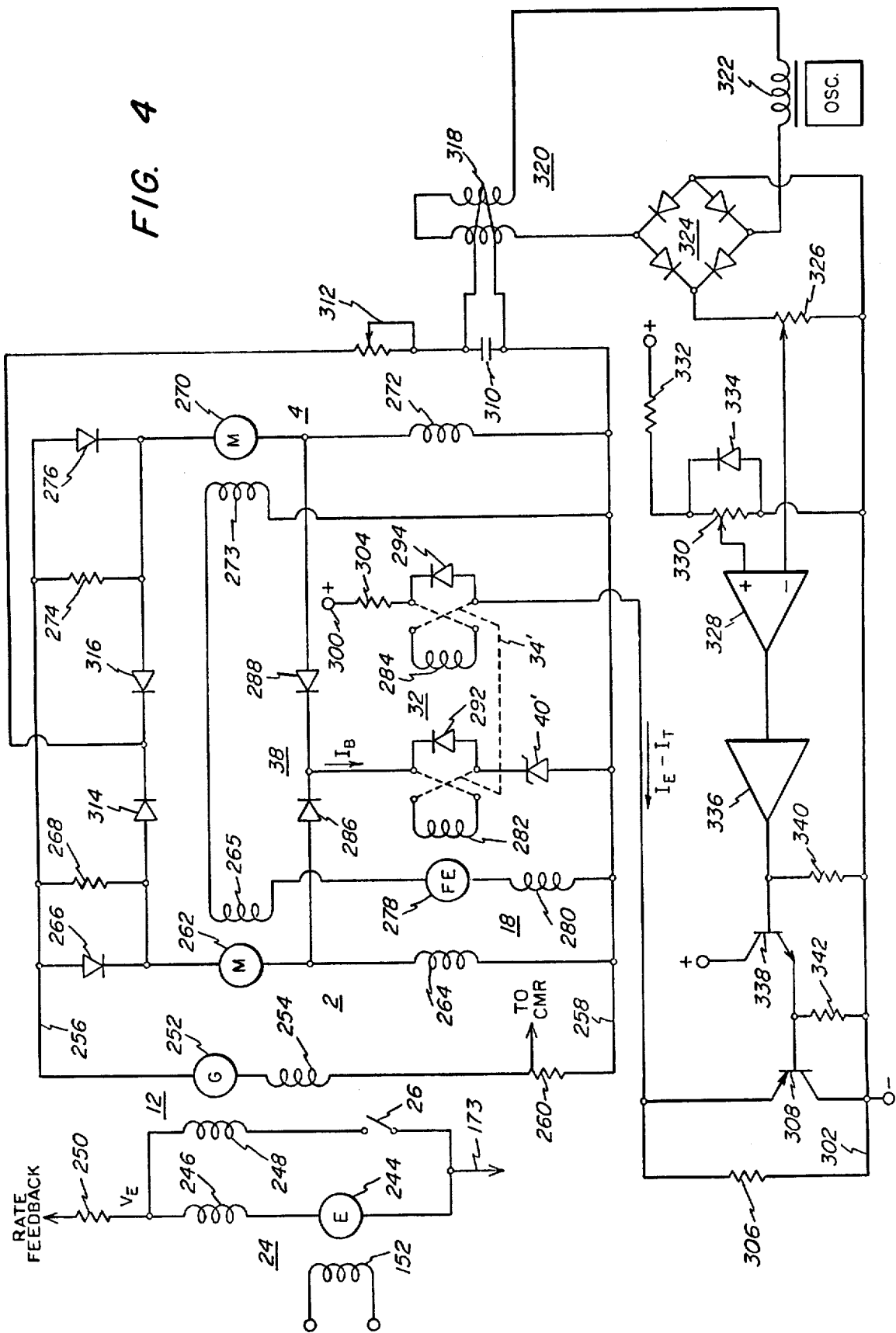
FIG. 4 is a schematic circuit diagram illustrating a preferred embodiment of the means shown in block form in FIG. 1 for controlling motor field.

FIG. 3 illustrates relevant circuit portions of the regulating system of the generating means 12. Current measuring reactor (CMR) 54 has control windings, identified as 52 and 64, for respectively applying the current feedback signal $I_G$ and the output signal $I_{FG}$ of function generator 62. The signal $I_G$ may be derived directly from current sensing means 260 in the output circuit of the generating means 12, as shown in FIG. 4, or derived from a summation device 60 as shown in FIG. 1. The output signal $I_{FG}$ is derived from a function generator 62 which may be of the type disclosed in patent No. 3,105,186. The main windings of the CMR are connected in series circuit with a source of a-c current 120 and bridge rectifier circuit 122 by lines 66' and 66". Similarly voltage measuring reactor (VMR) 46 has control windings identified as 16 and 96, for respectively applying the voltage feedback signal $V_G$ and the voltage control signal $I_{VC}$. The voltage feedback signal is derived by connecting the voltage control winding through resistor 124 to the output lines 202 and 204 of the generating means 12, shown in FIG. 4. The main windings of the VMR are connected in series circuit with a source of a–c current 126 and bridge rectifier circuit 128 by lines 48' and 48". Bridges 122 and 128 are connected serially in a reference current network. The reference current network comprises, in the order stated, a source of positive potential, resistor 130, bridges 122 and 128, reference current potentiometer 132, the parallel combination of normally closed relay switch 134 and potentiometer 136, and the common terminal, e.g. negative source of potential. An output circuit comprising serially connected diode 138, resistor 140, and control winding 74 is connected across reference bridges 122 and 128. Diodes 139, 141, and 143 are connected in series across bridges 122 and 128 are poled to limit the maximum output current.

In the above-described arrangement the impedance of the CMR 54 controls the flow of a-c current, i.e. from source 120 through rectifier bridge 122, and the impedance of the VMR 46 controls the flow of a-c current, i.e. from source 126, through rectifier bridge 128. The effective impedance of the CMR and thus the rectified a-c current through the CMR and bridge 122 is proportional to the sum of the signals applied to the control windings of the CMR. Similarly the effective impedance of the VMR and thus rectified a-c current through the VMR and bridge 128 is proportional to the sum of the signals applied to the control windings applied to the VMR. The reference current flows in the above-described reference current network, and diode 138 is poled to block the passage of reference current through the output circuit. As disclosed in U.S. Pat. Nos. 2,883,608 and 3,105,186, a control signal current flows through the output circuit only when either or both of the CMR and VMR outputs has a magnitude in excess of the reference current. The amplitude of the control current will then be a function of the differnce between the larger one of the currents $I_{VMR}$, $I_{CMR}$, and the reference current, $I_{REF}$.

PWM CIRCUIT

The output of the comparison circuit, control signal $I_{CONT}$, is applied to a control winding 74 of pulse width modulator, i.e. PWM summer 76. The PWM summer comprises a saturable transformer 142 whose primary winding is excited by a source of a-c 144. A single square wave oscillator is utilized to provide the a-c excitation for previously referenced a-c sources 120, 126, and 144, since these must be synchronized. The tapped secondary windings 145 of transformer 142 has its end terminals connected in a series circuit comprising diode 146, the first and second main windings of controlled saturable reactor 148, and diode 150. The junction of the first and second main windings are connected to a common terminal. This circuit constitutes a full wave rectifier circuit whose output, $I_{PWM}$, appears between line 80, connected to the center tap of transformer secondary winding 145, and the common terminal. The inputs to the PWM summer are applied to control windings on the saturable reactor 148. Thus the control signal, $I_{CONT}$, is applied to control winding 74, the rate feedback signal $I_{RF}$ to control winding 84 and the load control signal $I_{LC}$ to control winding 90. The output of the PWM summer on line 80 comprises a train of sequential square waves. If no control signals are applied to the control, the cores of saturable reactor 148 are saturated and the PWM output comprises a train of rectangular pulses having maximum time duration, i.e. the output has a maximum average value. This permits maximum excitation of the generating means. The presence of signals on the windings of saturable reactor 148 will reduce the flux in the winding cores proportionately to the sum of the applied control signals, and thus reduce the time duration of the pulses, and thus reduce the average amplitude of the pulse train.

GENERATOR EXCITER FIELD FUNCTION CIRCUIT

Exciter Field Function Circuit 78 receives the $I_{PWM}$ signal on line 80 and provides an appropriate excitation current $I_F$ to the field 152 of exciter 24. The regulator system operates such that maximum excitation current is permitted to flow when no control signals are applied to summer 76. As the magnitude of the control signals increases, e.g. $I_{CONT}$ increases, the excitation current $I_F$ decreases sharply toward zero. Further increase of $I_{CONT}$ causes a reversal of excitation current $I_F$ until the excitation current reaches a predetermined magnitude in the reverse, or negative, direction. This arrangement permits a sharp reduction of excitation current and thus of the output of the generating means 12. The reversal of excitation current upon application of a large control signal, permits full generator shut off. The negative field current produced, for example, when no pressure is applied to pedal 92 overcomes any residual magnetization in the generating means 12 and thus provides a zero voltage output. The magnitude of negative field current is limited by previously described diodes 139, 141, and 143 connected in parallel with the output of comparison circuit 70. An increase of control current I $_{CONT}$ causes a commensurate increase of the voltage across the comparison circuit output 74. However, when this voltage reaches a predetermined magnitude, diodes 139, 141, and 143 conduct such that the output voltage does not increase with further increases of the control signal.

The $I_{PWM}$ signal on line 80 is supplied through resistor 170 to PNP transistor 172 of function circuit 78. The emitter of 172 is connected to a common terminal, 173, and the collector is connected through resistor 174 to a positive terminal 175. In the preferred embodiment these terminals are supplied by a 28 volt battery. NPN transistor 160 and PNP transistor 158 are connected serially across the negative and positive terminals. Transistor 158 has its collector connected to the positive terminal and its emitter to the collector of transistor 160 and transistor 160 has its collector connected to common terminal 173. The junction between resistor 174 is connected by diode 176 to the base of transistor 158 and by serially connected diodes 178 and 180 to the base of transistor 160. Diodes 176, 178, and 180 are poled to pass base-emitter current of their respective transistors. Thus diode 176 is poled in reverse in respect to diodes 178 and 180.

The exciter 24 comprises the exciter field winding connected in a bridge circuit. Resistors 154 and 156 are connected serially from the positive terminal 175 to the negative terminal 173. Free wheeling diodes 166 and 168 are connected in parallel, respectively with resistors 154 and 156, and free wheeling diodes 162 and 164 are connected respectively across transistors 158 and 160. The exciter field winding 152 is connected from the junction of devices 154, 156, 166 and 168 to the junction of devices 158, 160, 162, and 164.

The $I_{PWM}$ signal applied to the base of transistor 172 comprises a train of pulse width modulated pulses, i.e.

positive pulses of varying width displaced by intervals when the signal is substantially zero. During time intervals when the input is positive, transistor 172 is gated on causing a reduction of its collector voltage and turn on of transistor 160. When transistor 160 conducts, current flows from positive terminal 175 through resistor 154, exciter field 152 and transistor 160. This constitutes the normal, i.e. positive, direction of current flow. At the expiration of one positive pulse when the voltage at the base of transistor 172 drops to zero that transistor is cut off causing transistor 160 to cut off and transistor 158 to turn on. Current now flows from the positive terminal 125 through transistor 158 exciter field 152 and resistor 156. This constitutes the revere, i.e. negative, direction of current flow. The described bridge circuit consequently alternately supplies positive and negative field current. The net field current is dependent on the modulation of the control signals and thus the respective time duration of positive and negative conduction.

VOLTAGE CONTROL CIRCUIT

The voltage control circuit 94 supplies a voltage control signal $I_{VC}$, on line 96, to the voltage measuring reactor, VMR 46, representative of the position of operator pedal 92. When the pedal is in its uppermost position a maximum $I_{VC}$ signal is produced, which in turn reduces towards zero the output voltage of the generating means 12 so as to prevent movement of the vehicle. Increasing depression of the pedal reduces the $I_{VC}$ signal and thus permits the output voltage of the generating means to increase so as to permit increasing vehicle speed. Pedal 92 is ganged to the arm 182 of potentiometer 184. The potentiometer is connected in a series circuit between a source of positive potential 175 and a common terminal 173, being connected through resistor 186 to source 175 and through serially connected diodes 188, 190, 192 to terminal 178. Potentiometer arm 182 is connected in a series circuit, comprising diode 194, resistor 196, diode 198 to the base of transistor 200. Resistors 202 and 204 are connected serially from the base of NPN transistor 200 to the common terminals and diode 206 is connected from the base to the junction of these resistors and is poled to assure that the emitter voltage is not positive in respect to the base of transistor 200. The collector is connected through resistor 208 to the source of positive potential.

The emitter of device 200 is connected to the base of transistor 210, whose base is coupled to the common terminal by serially connected resistor 212, rheostat 214, line 96 ad the associated control winding of voltage measuring reactor 46, and resistor 216. The collector of NPN transistor 210 is connected through resistor 218 to positive terminal 175.

When the pedal 92 is in its uppermost position, a maximum positive voltage is applied to the base of transistor 200, so as to fully turn it on. Accordingly the signal applied to the base of transistor 210 causes the latter to turn fully on causing maximum flow of current $I_{VC}$ through winding 96. As the pedal is depressed, arm 182 is lowered and the drive on transistors 200 and 210 is accordingly reduced, so as to reduce current $I_{VC}$ on lines 96. Diodes 188, 190, and 192 provide a bias to assure that full generator output is obtained upon full depression of pedal 92.

Arm 182 of potentiometer 184 is additionally connected through diode 194 and resistor 218 to the base of transistor 220. The collector of transistor 220 is connected through relay solenoid 222 and resistor 224 to positive terminal 175 and the emitter is connected to common terminal 173. Resistors 226 and 228 are serially connected between the positive and common terminals, and relay contactor 230 is connected from the junction of these resistors to the base of transistor 200. This circuit is intended to provide protection against breaks that might occur in the wires associated with pedal operated potentiometer 184. The pedal may be located on the floor of the vehicle cab, and wires leading to potentiometer 184 might therefore be somewhat more subject to breakage. In the event of breakage the potential on potentiometer arm 182 or diode 194 could drop to zero and a reduction of the signal $I_{VC}$. Such a condition could result in undesirable acceleration of the vehicle.

Under normal operating conditions, potentiometer arm 812 has sufficient positive potential to maintain transistor 220 in conduction. This is assured by the bias across diode 188, 190, and 192. Accordingly solenoid 222 is normally energized and contactor 230 is open. In the event the potential drops at the base of transistor 220, for example due to a break in the line to potentiometer arm 182, transistor 220 is cut off. Contactor 230 then closes and supplies sufficient positive potential to the base of transistor 200 to produce a maximum signal $I_{VC}$ and to retard travel of the vehicle.

Under specified operating conditions such as retarding the vehicle prior to reversing its direction, it may be desirable to override the manual speed controller and to minimize the speed of the vehicle regardless of the setting of the operator pedal 92. A contact 232 is provided for this purpose. Contact 232 is connected from the junction of resistor 186 and potentiometer 184 to the junction of resistors 196 and 218. When this contact is closed by an associated relay solenoid, an adequate positive terminal potential is supplied to the base of transistor 200 to reduce towards zero the speed of the vehicle.

ARRANGEMENT FOR MODIFYING TRACTION POWER RESPONSIVE TO LIFTING FORCE

Certain traction vehicles, such as front end loaders, have means such as a boom and bucket for penetrating and lifting matter during propulsion of the vehicle. Under such conditions it is desirable to properly apportion the distribution between the lifting force and the tractive effort. For example, a front end loader penetrates a pile of earth matter with substantial tractive effort, since torque is automatically increased upon an increase of load resistance. If an excessive cut is taken, excessive power is required to lift the cut matter. Under such conditions hydraulic lifting systems for boom and bucket assemblies operate at very slow speeds. In addition, the extremely high lifting force applied under such conditions displaces the loads imposed on the forward and rear axles of the vehicle. An excessive weight in the bucket of the front end loader excessively reduces the tractive effort provided by the rear wheels. Accordingly it is desirable to limit the cut to reasonable levels. This has been attained by limiting tractive effort as a function of the lifting force applied to the earth moving means, e.g. boom and bucket means. Accordingly an arrangement is provided for modifying the regulating system responsive to the magnitude of the lifting force so as to limit the output of the generating means 12 and thus the tractive effort of the vehicle. In a hydraulic lifting system the hydraulic pressure applied to the lifting pistons is a function of the lifting force, and this hydraulic pressure may be utilized to limit the output of the generating means. In the preferred embodiment this is accomplished by modification of the reference current. The section entitled "Generator Regulating System" stated, in connection with FIG. 1, that the reference signal $I_{REF}$ generally may have a constant magnitude representative of the normally available horsepower output of the prime mover 10, but that this reference signal, $I_{REF}$, was subject to modification responsive to the lifting force applied to the boom and shovel. The arrangement for accomplishing this is illustrated in FIG. 3. A hydraulic lifting system 106 typically comprises a hydraulic reservoir 234 containing fluid pumped by pump 236 which may be driven by prime mover 10, and is supplied through a control valve 238 to the hoist cylinder 240. The dot-dashed lines schematically indicate the closed loop fluid path. Line 242 constitutes the fluid line segment interconnecting the control valve and the hoist cylinder. Line 104 interconnects line 242 to hydraulic pressure switch 102. Switch 102 comprises a relay solenoid 108 which is energized when the fluid pressure in the line 242 exceeds a predetermined magnitude. Upon energization at the solenoid, normally closed switch 134 is opened. Switch 134 normally shunts potentiometer 136 in the reference current circuit. Thus when the fluid pressure in line 242 exceeds a predetermined magnitude and switch 134 opens, the resistance of the reference current network increases by the resistance of potentiometer 136. As described in the prior section "CMR, VMR, Reference Current and Comparison Circuits," the reference current circuit comprises devices 122, 128, 130, 132, 134, and 136. The increased resistance of this circuit decreases the reference current $I_{REF}$ applied to summer 70. Accordingly the control signal $I_{CONT}$ output of the comparison circuit is modified so as to further limit the output of the generating means 12. In the above-described embodiment while lifting force, i.e. hydraulic pressure, exceeds a predetermined magnitude transducer 102 is actuated to produce a stepped change of reference current and thus a stepped reduction of the attainable output of the generating means. For example, in the preferred embodiment such reduction occurs when the hydraulic pressure exceeds 1800 psi. For some applications a continuous analog rather than a stepped system could be utilized to provide gradual control.

GENERATOR AND TRACTION MOTOR CIRCUIT

Reference is now made to FIG. 4. This illustrates the exciter comprising the exciter field 152, the exciter armature 244 and additional exciter field winding 246. Energization of exciter field 152 was described in the prior section "Exciter Field Function Circuit" in connection with FIG. 3. The exciter armature 244 and exciter field 246 are connected in a closed loop series circuit with field 248, of generating means 12, and switch 26. One terminal of exciter armature 244 and of switch 26 are connected to a common or, i.e. negative, terminal 173. The junction of armature field 246 and of the generator field 248 provides a source of exciter armature voltage, $V_E$, which may be coupled such as through resistor 250 to provide the source of the rate feedback signal which is ultimately applied to winding 84 of the pulse width modulator, shown in FIG. 3.

The generating means 12 comprises the generator field winding 248, armature 252 and additional generator field 254. Armature 252 and field 254 are connected serially with one terminal of the armature being connected to positive generator output line 256 and one end of field 254 being connected through current sensing means 260 to negative generator output line 258. The output of the current sensor 260 provides the generator output current signal, $I_G$, to winding 52 of the current measuring reactor, CMR, as shown in FIG. 3. The traction motors are energized by lines 256 and 258.

FIG. 4 illustrates front traction motor 2 and rear traction motor 4 connected in parallel across lines 256 and 258. Obviously more or less motors may be utilized as required. For example, four motorized wheels, each comprising a traction motor, may be desirable. As shown in FIG. 4, traction motor 2 comprises an armature 262, a serially connected commutating field 264, and a separately excited field 265. One end of armature 262 is connected through diode 266 to line 256 and one end of field is connected to line 258. Diode 266 is poled for conduction in the normal propulsion mode. Resistor 268 shunts diode 266 and permits reverse motor armature conduction through the generator armature 252 during retarding operation thereby dynamically braking the vehicle. Armature 270 and commutating field 272 of motor 4 are connected in the same manner between lines 256 and 258 by means of diode 274 and resistor 276, which shunts diode 274. Motor 4 additionally comprises a separately excited field 273.

Fields 265 and 273 are excited by a motor field supply such as the illustrated exciter generator 18 comprising armature 278, commutating winding 280, and separately excited field windings 282 and 284. Commutating winding 280, exciter armature 278 and motor field windings 265 and 273 are connected in a series closed loop circuit, with the junction of fields 280 and 273 being connected to negative output line 258. The excitation applied to the separately excited field windings 282 and 284 establishes the output of field supply generator 18, and thus the traction motor field flux. As described in the section "Motor Field Excitation," the field excitation applied to exciter generator 18 normally has a predetermined magnitude. This is supplied by winding 284. When unusual tractive effort is required as indicated by traction motor currents in excess of a predetermined magnitude, a field boost circuit comprising winding 282 provides additional exciter field excitation so as to increase motor torque. Under conditions when the output voltage of the generator means approaches a maximum value, the circuit including winding 284 reduces, i.e. tapers, the output of field supply generator 18, and thus the field of the traction motors so as to permit operation at higher speeds.

FIELD CURRENT BOOST CIRCUIT

Under normal operation, i.e. without field boost, the separately excited traction motors preferably have a predetermined constant field excitation. This is advantageous in applications, such as front end loaders where motor load varies substantially. For example, the load increases rapidly when the loader enters an earth pile, and the load decreases rapidly when the loader breaks out of a pile. Variations of motor torque cause a proportional variation of armature current. In systems utilizing series motors, as opposed to separately excited motors having a constant field strength, the field varies proportionately with armature current. This variation in turn modifies back emf and thus results in a substantial change of motor speed. Therefore if a loader were driven by series motors it would experience a sudden increase of speed as a result of the abrupt reduction of torque upon breaking out of a pile. Such modifications of motor speed as a function of torque are obviously undesirable and defeat the ability of the operator to control vehicle speed by means of the previously described speed control system. While separately excited motors having a constant field flux avoid this problem, their maximum torque is undesirably limited in view of the previously described limits imposed on armature current. Accordingly provisions are made to augment, or boost, traction motor field flux to produce required maximum motor torque.

Specifically the field boost circuit increases field flux responsive to high armature currents. The preferred embodiment provides for field boosting as a function of armature current above a predetermined magnitude which is in excess of motor armature currents encountered during dynamic retarding. The above-described field boost is undesirable during dynamic retarding since the field boost increases terminal voltage and thus armature current. This positive feedback condition has been avoided by keeping the field boost circuit inactive as long as armature current is lower than the maximum output current produced by the motor during dynamic retardation.

The above-described undesirable speed variations resulting from load changes are minimized by limiting field boost within parameters so as to minimize changes of back emf. The normal motor field current is of such a high magnitude that each traction motor is magnetically saturated, whereby variations of field current produced by the field boost circuit once activated cause only small variations in motor field strength and back emf and thus result in only minimal variations of vehicle speed. For example, if a front end loader incorporating the described arrangement breaks out of a dirt pile, the resulting reduction of load, armature current and field current does not result in a sudden undesirable increase in back emf.

Vehicles such as front end loaders also encouner substantial load variations between the front and rear traction motors. For example, when the bucket of a front end loader is pushed down into a pile, the load on the front wheels, and thus on the front traction motors, may be sharply reduced in respect to the loads in the rear. Conversely when the loader is in the hoist mode, i.e. is actually lifting matter, the load on the rear wheels, and thus on the rear traction motors, may be sharply reduced in respect to the loads in the front. In order to assure appropriate application of field boost, the field boost circuit is responsive to the largest one of the individual motor armature currents. Responsive to an armature current above the predetermined magnitude, substantially equal field boost currents are applied to all traction motors. This minimizes motor slip even of motors which have no applied load, since all traction motors are supplied with substantially the same armature voltages and substantially equal field flux.

The field boost circuit of the preferred embodiment is now described in connection with FIG. 4. Commutating field 264 of motor 262 is not a reactive member contributing to the generation of motor back emf. Therefore the voltage across field 264 is a pure function of motor 2 armature current and is utilized to provide a signal proportional to armature current. Field 264 is connected in series circuit with diode 286, exciter field winding 282 and zener diode 40'. Similarly the voltage across commutating field 272 is a pure function of motor 4 armature current. Diode 288 is connected from the junction of armature 270 and commutating field 272 to the junction of exciter boost field 282 and diode 286. Diode 286 is connected from the junction of motor armature 262 and commutating field 264 to field 282, and both diodes have their cathodes connected to field 282. The diode arrangement thus constitutes an OR gate connected such that only that diode connected to the commutating field with the higher voltage is subject to conduction. Such conduction occurs when this higher voltage exceeds the sum of the breakdown voltage of the zener diode 40' and the potential drop across the exciter field 282 and diode 286. Thus if the voltage at the junction of armature 262 and commutating coil 264 is of sufficient magnitude, and exceeds the voltage at the junction of armature 270 and commutating field 272, diode 286 conducts, and current $I_B$ through the exciter boost field 282 is then a function of current through armature 262. Accordingly, when armature current exceeds a predetermined threshhold the current through exciter field 282 generates field flux which boosts the exciter field flux produced by exciter field 284, thereby causing the exciter 18 to supply to the field windings 265 and 273 of the respective motors 2 and 4 corresponding increments of field excitation which will equally increase the torques of both motors. As armature current increases above the breakdown threshhold there is a commensurate increase of current through field 282 and additional boost.

Obviously means other than zener diode 40' may be utilized to control the activation of the boost field excitation means. The preferred embodiment utilizes a maximum current limit of 1200 amperes per motor, and the parameters of the field current boost circuit were sized to provide for field boost commencing with motor currents in excess of 800 amperes. Free wheeling diodes 292 and 294 are connected, respectively, across fields 282 and 284 to protect the fields and in the case of diode 292 also zener diode 40' and diodes 286 and 288. Fields 282 and 284 are connected in circuit through respective reversing contactors 34' which may be ganged and operated by a single reversing means in order to reverse motor direction.

VOLTAGE FUNCTION FIELD TAPER

As described in the preceding sections "Motor Field Excitation" and "Generator and Traction Motor Circuit," the traction motors normally operate with substantially constant and equal field excitation, established by the field excitation of winding 284 of exciter generator 18, illustrated in FIG. 4. The exciter field winding 284 is connected in a series circuit comprising positive potential source 300, resistor 304, exciter field winding 284, the parallel combination of transistor 308 and resistor 306, and negative bus 302. During normal operation, transistor 308 is fully conducting, such that a substantially constant excitation current $I_E$ flows through winding 284. This current is determined by the magnitude of resistor 304, and it is selected so that the resulting motor field current produced by the exciter generator 18 is adequate to magnetically saturate the motors 2 and 4 as previously explained.

During normal operation the vehicle speed is controlled by the voltage limit speed control. If it is desired to increase the speed, the maximum available generator voltage, and thus the traction motor armature voltage, is increased up to the ultimate predetermined maximum voltage output of the generator. In order to attain even higher speeds, the field is weakened as the ultimate maximum generator voltage is approached. This is accomplished by tapering back, i.e. reducing, the motor field when the motor armature voltage exceeds a predetermined magnitude. Such taper does not commence until the armature voltage closely approaches the ultimate maximum armature voltage such that the field is maintained constant during normal operation in order to assure accurate horsepower and speed control In the preferred embodiment field taper control is effected by gradually and smoothly reducing conduction of transistor 308 until transistor 308 is fully cut off. Thus the current flow through field 284 is reduced from a normal value $I_E$ by an increasing taper, i.e. $I_T$. When transistor 308 is fully cut off, the field current $I_E–I_T$ reaches a minimal value determined by the sum of the magnitudes of resistor 304 and resistor 306. For example, in the preferred embodiment the maximum armature voltage limit is 700 volts. Taper, for example, commences at 650 volts and continues to 680 volts, when transistor 308 is cut off. The minimal field current, existing for example from 680 to 700 volts, establishes a maximum top speed and prevents undesirable higher run away speeds. The taper, e.g. between 650 and 680 volts, is intended to assure smooth transition.

The voltage function field taper circuit additionally is operative during dynamic retarding to regulate motor terminal voltage. During dynamic retarding the traction motor load comprises a resistance, e.g. 268, and the armature of generating means 12. If the motor armature volage increases excessively, the voltage function field taper circuit reduces, i.e. tapers, the motor field. This reduces excitation of the motor and thus prevents excessively high motor armature voltages.

During the propulsion mode the armature voltage of parallel connected traction motors 2 and 4 corresponds to the output voltage of generator means 12, and field taper can be controlled as a function of that voltage. However, during dynamic retardation, also termed dynamic braking, the motor armature voltage varies independently of the generator output. During dynamic retardation there may be variations between the armature voltages of the respective traction motors. Accordingly, the preferred embodiment senses armature voltage of the individual traction motors and equally reduces the level of field excitation of each motor by a magnitude proportional to the armature voltage of largest magnitude when that voltage exceeds the predetermined reference level.

As illustrated in FIG. 4, this is accomplished by a circuit comprising diodes 314 and 316, rheostat 312 and cntrol winding 318 of saturable reactor 320. Diode 314 has its anode connected to the junction of armature 262 and diode 266, diode 316 has its anode connected to the junction of armature 270 ad diode 276. The cathodes of diodes 314 and 316 are connected to each other and to rheostat 312. The brush of rheostat 312 is connected through the control winding 318 to bus 258. The diodes are thus connected in an OR circuit, of the type described in the preceding section, so that the current through control winding 318 is a function of the largest one of the armature voltages of motors 2 and 4. During motoring both of these voltages will be virtually the same as the output voltage of the generator 12.

Saturable reactor 320 has its main windings connected in series circuit with bridge rectifier 324 and a source of square wave 324, such that the output of rectifier 324, as applied across potentiometer 326, is representative of the armature voltage signal. The saturable reactor circuit arrangement is similar to the VMR and CMR circuits described in the section "CMR, VMR, Reference Current and Comparison Circuits," and a common source of square waves is utilized.

Operational amplifier 328 has one input connected to the arm of potentiometer 326 and a second input to the arm of potentiometer 330. One end of potentiometer 330 is connected to negative bus 302 and its other end is connected through potentiometer 332 to a source of positive potential. A Zener diode 334 is connected across potentiometer 330, so as to maintain a predetermined reference potential across the potentiometer. Under normal operating conditions, amplifier 328 conducts. As the armature voltage exceeds the predetermined threshold, at which tapering is to commence, the potential applied from potentiometer 326 to the one input of amplifier 328 increases sufficiently to reduce its conduction. This threshhold can be adjusted by means of potentiometer 330. The output of amplifier 328 is connected to the input of inverting amplifier 336. The latter is normally cut off, and commences to turn on as amplifier 328 commences to turn off. The output of amplifier 336 is connected to the base of NPN transistor 338, whose collector is connected to a source of positive potential and whose collector is connected to the base of PNP tansistor 308. Base resistors 340 and 342 are connected from the base, respectively, of transistors 338 and 308 to negative bus 302. As amplifier 336 turns on, normally cut off device 308 cuts off. Thus turn off of device 308 occurs as a function of armature voltage, and the threshhold where field taper commences is adjustable.

The described field taper arrangement is adjusted so as to preclude any reduction in field strength until the armature voltage approaches the ultimate voltage limit, thereby permitting desired speed and torque control operation over the normal operating range and providing for gradual taper and thus smooth variation of speed. Additionally, taper operates as a direct function of armature voltage. Since the field is tapered as a direct function of high armature voltage, it is effective on an "as needed" basis during the propulsion mode and is available to regulate motor terminal voltage during the retarding mode.

While a preferred form of the invention has been herein shown and described by way of illustration, modifications and variations thereof will probably occur to persons skilled in the art. It is therefore intended by the concluding claims to cover all such changes and modifications as fall within the true spirit and scope of this invention.

What was claim as new and desire to secure by Letters Patent of the U.S. is:

1. For use in an electrically propelled traction vehicle wherein a thermal prime mover drives electrical generating means supplying electrical energy to separately excited d-c traction motor means, a propulsion control system for controlling the excitation of the field of said generating means to limit the electrical output of said generating means responsive to the available output of said prime mover, said propulsion control system comprising:
   a. a source of voltage feedback signals representative of the actual voltage output of said generating means applied to said motor means;
   b. a source of current feedback signals representative of the actual current output of said generating means applied to said motor means;
   c. power signal means for combining said voltage and current feedback signals to generate power feedback signals;
   d. a source of reference signals;
   e. comparison means for comparing said voltage feedback signals with said reference signals and said power feedback signals with said reference signal to generate control signals adapted to modify the field excitation of said generating means to limit the output of said generating means within both a predetermined maximum horsepower limit and a given voltage limit which has a predetermined maximum value;
   f. manually adjustable vehicle speed control means adapted to provide a voltage control signal having a magnitude representative of the setting of said speed control means;
   g. speed control circuit means for coupling said voltage control signal in circuit with the means for comparing said voltage feedback and said reference signals to reduce the voltage output limit of said generating means below said predetermined maximum value as a function of the setting of said speed control means without modifying the maximum horsepower limit of the generating means.

2. The arrangement of claim 1 wherein said manually adjustable speed control means comprises a moveable member coupled to a potentiometer circuit providing said voltage control signal.

3. The arrangement of claim 2 wherein said speed control circuit means comprises means for summing said voltage control signal and said voltage feedback signals to produce a modified voltage feedback signal, said power signal means comprises means for subtracting a predetermined function of said voltage feedback signals from said current feedback signals to generate a power feedback signal, and said comparison means comprises OR logic means adapted to receive said modified voltage feedback signal and said power feedback signal and means for comparing the greater one of said received signals with said reference signals to generate said control signals.

4. For use in a traction vehicle including thermal prime mover means which drives electrical generating means supplying electrical energy to traction motor means for propelling the vehicle, the speed of said motor means during propulsion of the vehicle being dependent on the voltage output of said generating means, an improved electric propulsion control system adapted to regulate the electrical output of said generating means within predetermined maximum limits and to control said motor speed, wherein the improvement comprises:
   a. a variable excitation source arranged normally to supply a predetermined maximum level of excitation to the field of said generating means;
   b. first means for providing feedback signals which respectively vary as functions of the voltage and the power levels of the electrical output supplied by said generating means to said motor means; p1 c. means associated with said excitation source and coupled to said first means for determining voltage and power limits, respectively, of the voltage and power feedback signals and for reducing the excitation of said generating means in the event said voltage feedback signal attains said voltage limit or said power feedback signal attains said power limit; and
   d. means for modifying said voltge limit as a function of desired vehicle speed so that said voltage limit varies with desired speed between zero and a predetermined maximum level.

5. The improvement of claim 4 wherein said last-mentioned means comprises manually adjustable speed control means for providing a voltage control signal representative of the desired vehicle speed, said control signal being variable from a value corresponding to said predetermined maximum level to zero as the setting of said speed control means is adjusted to increase the desired speed from zero to maximum, and means for reducing said voltage limit from its predetermined maximum level in accordance with the value of said control signal.

6. The improvement of claim 5 wherein said voltage limit is substantially zero when said voltage control signal has maximum value.

7. The improvement of claim 4 wherein said motor means are adapted to be connected for operation in a dynamic retardation mode after the excitation of said generating means is reduced in response to a reduction of said voltage limit resulting from a decrease in desired vehicle speed and prior to a corresponding reduction of said voltage feedback signal.

8. The improvement of claim 4 wherein said traction motor means comprises at least one separately excited d-c motor the field of which is normally supplied with substantially constant excitation.

* * * * *